(12) United States Patent
Iyoda et al.

(10) Patent No.: US 7,806,607 B2
(45) Date of Patent: Oct. 5, 2010

(54) CYLINDRICAL MOLDED ARTICLE, LENS BARREL, CAMERA, AND INJECTION MOLD

(75) Inventors: Makoto Iyoda, Osaka (JP); Suguru Nakao, Hyogo (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 12/021,517

(22) Filed: Jan. 29, 2008

(65) Prior Publication Data
US 2008/0181602 A1    Jul. 31, 2008

(30) Foreign Application Priority Data
Jan. 29, 2007    (JP) .............................. 2007-018405

(51) Int. Cl.
G03B 17/00    (2006.01)
G02B 7/02     (2006.01)
B22C 9/24     (2006.01)

(52) U.S. Cl. .................... 396/529; 359/819; 249/57

(58) Field of Classification Search ................ 396/529; 359/819, 820, 700; 425/573; 429/53, 59; 428/34.1; 249/57
See application file for complete search history.

(56) References Cited

U.S. PATENT DOCUMENTS

| 4,826,424 A * | 5/1989 | Arai et al. .................. 425/542 |
| 5,639,403 A | 6/1997 | Ida et al. |
| 6,424,469 B2 | 7/2002 | Hirai |
| 6,567,222 B2 | 5/2003 | Shirota |
| 2001/0017735 A1 | 8/2001 | Nomura et al. |
| 2004/0156127 A1 | 8/2004 | Nomura et al. |

FOREIGN PATENT DOCUMENTS

| JP | 06-347687 | 12/1994 |
| JP | 8-227637 | 9/1996 |
| JP | 2995509 | 10/1999 |
| JP | 2002-370268 | 12/2002 |
| JP | 3523249 | 2/2004 |
| JP | 2005-308843 | 11/2005 |

* cited by examiner

*Primary Examiner*—W. B. Perkey
*Assistant Examiner*—Minh Q Phan
(74) *Attorney, Agent, or Firm*—McDermott Will & Emery LLP

(57) ABSTRACT

A drive frame 34 serving as a cylindrical molded article includes a drive frame main body 34a, three first cam grooves 34c, three second cam grooves 34d, three first gate portions 84b, and three high-density regions H. The first gate portions are formed at the end of the cylindrical portion, and are vestiges of gates in injection molding. The high-density regions H are regions in which there is the highest proportion of the axial direction dimension accounted for by the first cam grooves 34c and the second cam grooves 34d with respect to the axial direction dimension of the drive frame main body 34a. The first gate portions 84b are disposed at a location closer to one of two adjacent high-density regions than the other in the circumferential direction of the two adjacent high-density regions H.

20 Claims, 8 Drawing Sheets

CYLINDRICAL MOLDED ARTICLE, LENS BARREL, CAMERA, AND INJECTION MOLD

CROSS-REFERENCE TO RELATED APPLICATIONS

This application claims priority to Japanese Patent Application No. JP2007-018405 filed on Jan. 29, 2007. The entire disclosures of Japanese Patent Application No. JP2007-018405 is hereby incorporated herein by reference.

BACKGROUND OF THE INVENTION

1. Field of the Invention

The present invention relates to a cylindrical molded article and an injection mold, and more particularly relates to a cylindrical molded article used in the lens barrel of a camera and an injection mold.

2. Description of the Related Art

One conventional type of lens barrel is a multistage retractable lens barrel. This kind of lens barrel is made up of a plurality of cylindrical members of different diameter. To convert the rotational motion of the cylindrical members into axial linear motion, three cam grooves and three cam pins that engage with these cam grooves are provided to a plurality of cylindrical members, for example. The cam grooves are usually formed on the inner peripheral part of the cylindrical members.

It is generally difficult to machine cam grooves on the inner peripheral part of cylindrical members. Therefore, the cylindrical members that make up a lens barrel are formed by injection molding. An injection molding apparatus mainly includes an injection mold, and an injection apparatus for injecting the molten molding material into the mold. The injection apparatus can be adjusted for molding material injection pressure and injection speed.

The injection mold is provided with a cavity, a sprue, a plurality of runners, and a plurality of gates. The cavity is a hollow space used for form a molded article. The sprue is a channel through which flows the molding material injected from the injection apparatus. The runners guide the molding material from the sprue to the cavity. The gates are constrictions for preventing the back-flow of the molding material from the cavity to the runners, and are disposed between the runners and the cavity. In the case of a cylindrical molded article, a plurality of runners are disposed at a constant pitch in the circumferential direction so that the molding material will flow evenly. A plurality of gates are also disposed at a constant pitch in the circumferential direction.

Injection molding mainly includes a temperature adjustment step in which the temperature of the metal mold is adjusted, a filling step in which the mold is filled with the molding material, and a pressure-holding cooling step in which the molded article is cooled inside the mold. In the pressure-holding cooling step, the pressure is held at a specific level by the injection apparatus. This causes molding material to be supplied to portions where heat shrinkage has occurred, and minimizes deformation of the molded article due to heat shrinkage.

However, the wall thickness of the cylindrical molded article is uneven because of the cam grooves. Consequently, the thicker and thinner parts cool at different rates in the pressure-holding cooling step, so the heat shrinkage varies from place to place. As a result, there is a decrease in the circularity of the cylindrical molded article, and the cylindrical molded article cannot be obtained as designed. Even though the pressure is maintained in the pressure-holding cooling step, it may be impossible to suppress deformation of the molded article, depending on the shape of the cam grooves.

If the cylindrical molded articles that make up a lens barrel have decreased circularity, the cam grooves will be offset in the radial direction from the designed positioned. As a result, the lens group supported by the plurality of cylindrical molded articles becomes out of position, and this adversely affects the optical performance of the imaging optical system. Also, if the cam grooves become misaligned in the radial direction with respect to the designed position, there will be greater sliding resistance between the cam grooves and the cam pins, which hinders smooth zoom operation. As a result, greater drive force is necessary, and this increases power consumption.

In view of this, as disclosed in Japanese Patents 3,523,249 and 2,995,509, correction of the injection mold is generally carried out in conventional injection molding. More specifically, with a conventional metal mold design, deformation due to heat shrinkage is predicted on the basis of experimentation or simulation. The mold is produced in the shape of the molded article according to the predicted amount of deformation. Next, a prototype is formed using the mold thus produced. The dimensions of the various parts of the prototype are measured, and the differences between the design and measured values are calculated. Metal mold correction is performed using this dimensional error as an offset value. In the case of cylindrical molded articles used in a lens barrel, the cavity of the mold is formed as a cylindrical hollow space that is not a true circle.

If there is a large difference between the design and measured values, then more of the mold has to be machined, so mold correction takes more time. Also, if there is a large difference between the design and measured values, then there is greater dimensional change in the various parts of a prototype formed with the corrected mold than with a prototype formed with the initial mold. Consequently, it is unlikely that a molded article will be obtained with the design values after just one mold correction.

Conversely, if there is a small difference between the design and measured values in a prototype produced by the initial mold, mold machining takes less time and it is more likely that a cylindrical molded article will be obtained with the design values after a single mold correction.

As discussed above, it is preferable with an injection mold for the error from the design values of a molded article to be kept as small as possible.

On the other hand, there is a need in the field of digital cameras for the main body to be as compact as possible to make the product more portable. More specifically, there is a need to reduce the size of the lens barrel, which is considered to be a major factor in obtaining a smaller overall size. One way to make a lens barrel smaller is to increase the change ratio of the focal distance in zooming. As this is done, the shape of the cam grooves becomes more complicated, and the difference in the wall thickness of the cylindrical molded articles increases. Consequently, reducing the size of a lens barrel leads to a decrease in dimensional precision in cylindrical molded articles.

However, with the prior art discussed above, all that was proposed was a method for measuring dimensional error, or a method for predicting dimensional error by simulation and factoring this error into the metal mold design.

When a cylindrical molded article having a cam groove is injection molded, there seems to be some kind of relationship between the circularity and shape of the cam groove, but the details of this relationship are not yet clear. Therefore, with a conventional injection mold, even if changes are made to the shape of the cam grooves, there is the risk that more mold corrections will be necessary.

SUMMARY OF THE INVENTION

It is an object of the present invention to provide a cylindrical molded article and an injection mold, with which manufacturing cost can be reduced and dimensional precision can be increased.

To achieve the stated object, the inventors discovered that dimensional precision of a cylindrical molded article can be increased by adjusting the gate position according to the shape of a cam groove.

Experiments have revealed that the regions where cam grooves are clustered in cylindrical molded articles (hereinafter referred to as high-density regions) tend to move inward in the radial direction due to heat shrinkage. The walls are thinner in these high-density regions than in the surrounding regions, and the flow resistance of the molding material during injection molding is higher in the high-density regions. Accordingly, pressure loss of the molding material is greater in the high-density regions than in the surrounding regions, and the molding material has more difficulty flowing into the high-density regions in the pressure-holding cooling step. As a result, in the pressure-holding cooling step, even if the high-density regions undergo heat shrinkage, the molding material tends not to be replenished in an amount corresponding to the heat shrinkage, and deformation due to heat shrinkage in the high-density regions tends not to be suppressed with a conventional cylindrical molded article. As a result, the heat shrinkage causes the high-density regions to move inward in the radial direction.

In view of this, the cylindrical molded article according to a first aspect of the present invention is a cylindrical molded article formed by injection molding, including a cylindrical portion, at least three cam grooves, three first gate portions, and three high-density regions. The cam grooves are formed in either the inner peripheral part or the outer peripheral part of the cylindrical portion. The first gate portions are formed at an end of the cylindrical portion, and are vestiges of gates in injection molding. The high-density regions are regions on the faces where the cam grooves are formed, in which there is the highest proportion of the axial direction dimension accounted for by the three or more cam grooves with respect to the axial direction dimension of the cylindrical portion. The first gate portions are disposed closer to one of two adjacent high-density regions than the other of the two adjacent high-density regions in the circumferential direction.

Here, the first gate portions are vestiges of gates in injection molding, and the positions of the first gates correspond to the positions of gates of the injection mold. The gates are portions where the molding material flows from a runner into a cavity in injection molding, and are a portion in which the channel is constricted so that the molding material will not back-flow into the runner in the pressure-holding cooling step.

The high-density regions are regions where cam grooves are clustered, and are portions where the wall of the cylindrical molded article is thinner. That is, in the high-density regions, the flow resistance of the molding material is higher, and the molding material tends not to flow in. An example of the molding material is a thermoplastic resin or other such synthetic resin.

With this cylindrical molded article, the first gate portions are disposed at a location closer to the other of the high-density regions. That is, the first gate portions are disposed in the vicinity of the high-density regions. Therefore, in injection molding, the molding material tends to flow into the high-density regions, and in the pressure-holding cooling step, deformation of the cylindrical molded article due to heat shrinkage tends to be suppressed more than in the past. As a result, if the disposition of the first gate portions is given thought at the metal mold design stage, the amount of deformation of a cylindrical molded article formed with an initial mold will be less than in the past, and dimensional precision can be increased without increasing the number of mold corrections. Specifically, with this cylindrical molded article, manufacturing cost can be reduced while dimensional precision is increased.

The cylindrical molded article according to a second aspect of the present invention is the cylindrical molded article of the first aspect, further including three second gate portions that are formed at an end of the cylindrical portion as vestiges of gates in injection molding. The second gate portions are disposed at a location closer to one of two adjacent high-density regions than the other in the circumferential direction of the two adjacent high-density regions.

In this case, the first gate portions and second gate portions are disposed in the vicinity of the high-density regions, and therefore the molding material tends to flow more reliably into the high-density regions, and in the pressure-holding cooling step, deformation of the cylindrical molded article due to heat shrinkage tends to be suppressed better than in the past.

Here, the second gate portions are vestiges of gates in injection molding, and the locations of the second gates correspond to the locations of the gates of the injection mold.

The cylindrical molded article according to a third aspect of the present invention is the cylindrical molded article of the second aspect, wherein the first gate portions are disposed at a location closer to one of two adjacent second gate portions than the other in the circumferential direction of the two adjacent second gate portions.

Here, the first gate portions and second gate portions are disposed at a constant pitch in the circumferential direction. This makes it easier to dispose the first gate portions and second gate portions in the vicinity of the high-density regions.

The cylindrical molded article according to a fourth aspect of the present invention is the cylindrical molded article of the second or third aspects, wherein the high-density regions are disposed in the circumferential direction between the first gate portions and one of two adjacent second gate portions.

In this case, the high-density regions are disposed in a region where the distance between the first gate portions and second gate portions is shorter. Therefore, the molding material flows more readily into the high-density regions.

The cylindrical molded article according to a fifth aspect of the present invention is the cylindrical molded article of any one of the first to fourth aspects, further including three low-density regions. The low-density regions are regions on the faces where the cam grooves are formed, in which there is the lowest proportion of the axial direction dimension accounted for by the three or more cam grooves with respect to the axial direction dimension of the cylindrical portion. The first gate portions are disposed at a location closer to the high-density regions than to the low-density regions in the circumferential direction between adjacent high-density regions and low-density regions.

The low-density regions are regions in which the proportion accounted for by the cam grooves is the lowest, and in which the flow resistance is lower than in the high-density regions, and where the molding material tends to flow in. Therefore, if the first gate portions are moved closer to the high-density regions than to the low-density regions, the molding material will tend to flow into the high-density regions.

The cylindrical molded article according to a sixth aspect of the present invention is a lens barrel supporting an imaging optical system, including the cylindrical molded article according to any one of the first to fifth aspects and a lens frame. The lens group included in the imaging optical system is fixed to the lens frame, which has at least three cam pins that engage with the cam grooves.

Since this lens barrel makes use of a cylindrical molded article with improved dimensional precision, the positional precision of the lens group is improved, and the optical performance of the imaging optical system is higher.

The camera according to a seventh aspect of the present invention includes the lens barrel according to the sixth aspect, an imaging optical system supported by the lens barrel, an imaging unit for capturing an optical image of a subject formed by the imaging optical system, and an outer case supporting the lens barrel.

With this camera, the optical performance of the imaging optical system is improved, so the quality of the acquired images is higher.

The injection mold according to an eighth aspect of the present invention is an injection mold for injection molding a molding material to obtain a cylindrical molded article having at least three cam grooves. This injection mold includes a first portion, a second portion, a third portion, and a fourth portion. The first portion has a cavity arranged to mold a cylindrical molded article. The second portion has a sprue into which the molding material is injected. The third portion has three first runners connected to the sprue. The fourth portion has three first gates that connect the cavity and the three first runners. The high-density regions are regions in which there is the highest proportion of the axial direction dimension accounted for by the portion corresponding to the three or more cam grooves with respect to the axial direction dimension of the cavity. The first gates are disposed at a location closer to one of two adjacent high-density regions than the other in the circumferential direction of the two adjacent high-density regions.

Here, the high-density regions correspond to regions where the cam grooves cluster in the cylindrical molded article. That is, in the high-density regions of the cavity, the flow resistance of the molding material is higher and the molding material tends not to flow in. An example of the molding material is a thermoplastic resin or other such synthetic resin.

With this injection mold, the first gates are disposed at a location closer to the other of the high-density regions. That is, the first gates are disposed in the vicinity of the high-density regions. Therefore, in injection molding, the molding material tends to flow into the high-density regions, and in the pressure-holding cooling step, deformation of the cylindrical molded article due to heat shrinkage tends to be suppressed more than in the past. As a result, if the disposition of the first gates is given thought at the metal mold design stage, the amount of deformation of a cylindrical molded article formed with an initial mold will be less than in the past, and dimensional precision can be increased without increasing the number of mold corrections. Specifically, with this injection mold, manufacturing cost can be reduced while dimensional precision is increased.

The injection mold according to a ninth aspect of the present invention is the injection mold according to the eighth aspect, wherein the third portion further has three second runners connected to the sprue. The fourth portion further has three second gates that connect the second runners and the cavity. The second gates are disposed at a location closer to one of two adjacent high-density regions than the other in the circumferential direction of the two adjacent high-density regions.

In this case, the first gates and second gates are disposed in the vicinity of the high-density regions, and therefore the molding material tends to flow more reliably into the high-density regions, and in the pressure-holding cooling step, deformation of the cylindrical molded article due to heat shrinkage tends to be suppressed better than in the past.

The injection mold according to a tenth aspect of the present invention is the injection mold according to the ninth aspect, wherein the first gates are disposed at a location closer to one of two adjacent second gates than the other in the circumferential direction of the two adjacent second gates.

Here, the first gates and second gates are disposed at an irregular pitch, which makes it easier to dispose the first gates and second gates in the vicinity of the high-density regions.

The injection mold according to an eleventh aspect of the present invention is the injection mold according to the ninth or tenth aspect, wherein the high-density regions are disposed in the circumferential direction between the first gates and the other of the two adjacent second gates.

In this case, the high-density regions are disposed in a region where the distance between the first gate portions and second gate portions is shorter. Therefore, the molding material flows more readily into the high-density regions.

The injection mold according to a twelfth aspect of the present invention is the injection mold according to any one of the eighth to eleventh aspects, wherein the first portion further has three low-density regions. The low-density regions are regions in which there is the lowest proportion of the axial direction dimension accounted for by the portion corresponding to the three or more cam grooves with respect to the axial direction dimension of the cylindrical portion. The first gates are disposed at a location closer to the high-density regions than to the low-density regions in the circumferential direction between adjacent high-density regions and low-density regions.

The low-density regions are regions in which the proportion accounted for by the cam grooves is the lowest, and in which the flow resistance is lower than in the high-density regions, and where the molding material tends to flow in. Therefore, if the first gate portions are moved closer to the high-density regions than to the low-density regions, the molding material will tend to flow into the high-density regions.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The lens barrel and camera according to the present invention will now be described with reference to the drawings.

1. Overview of Digital Camera

Figure 1:
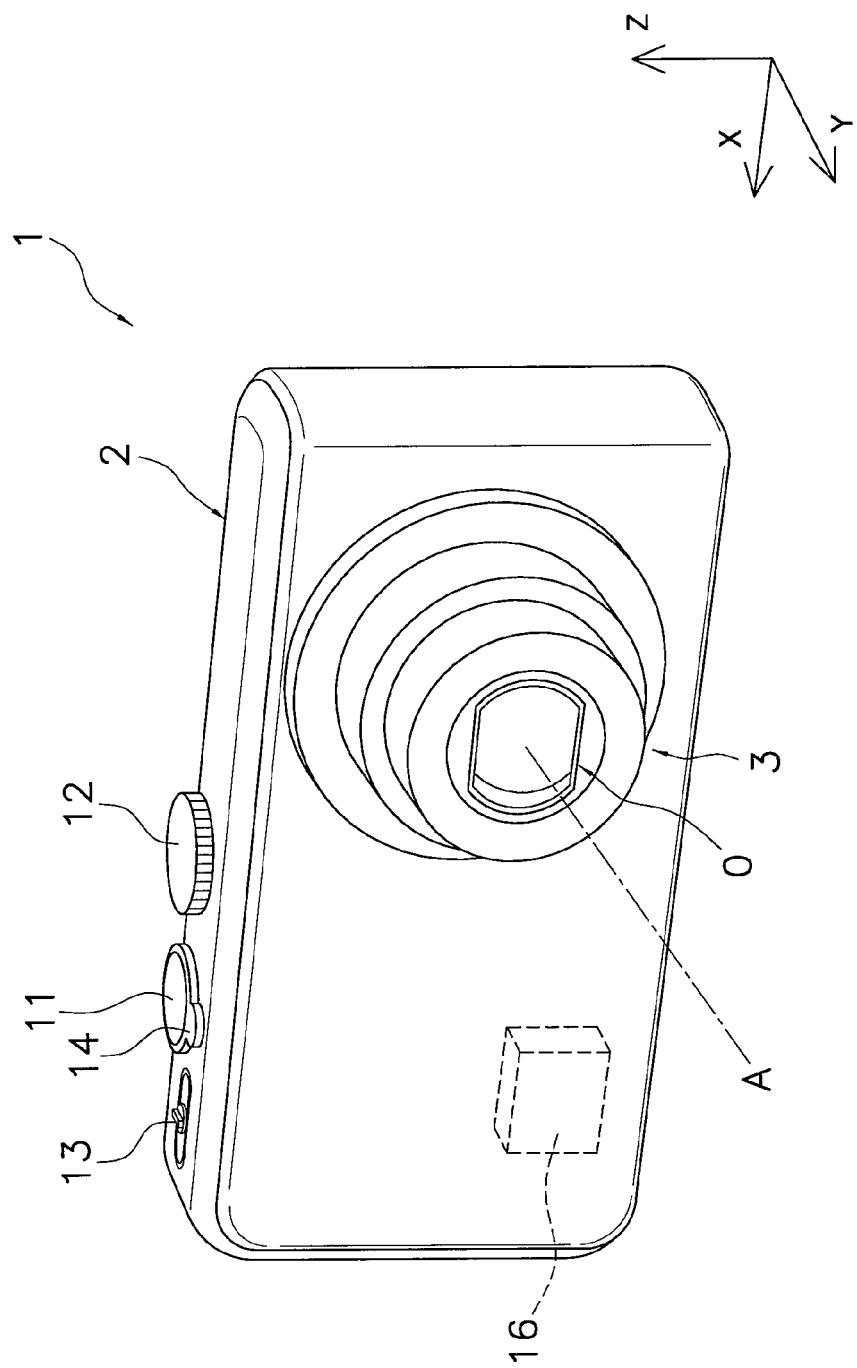
FIG. 1 is a schematic perspective view of a digital camera.
Figure 2:
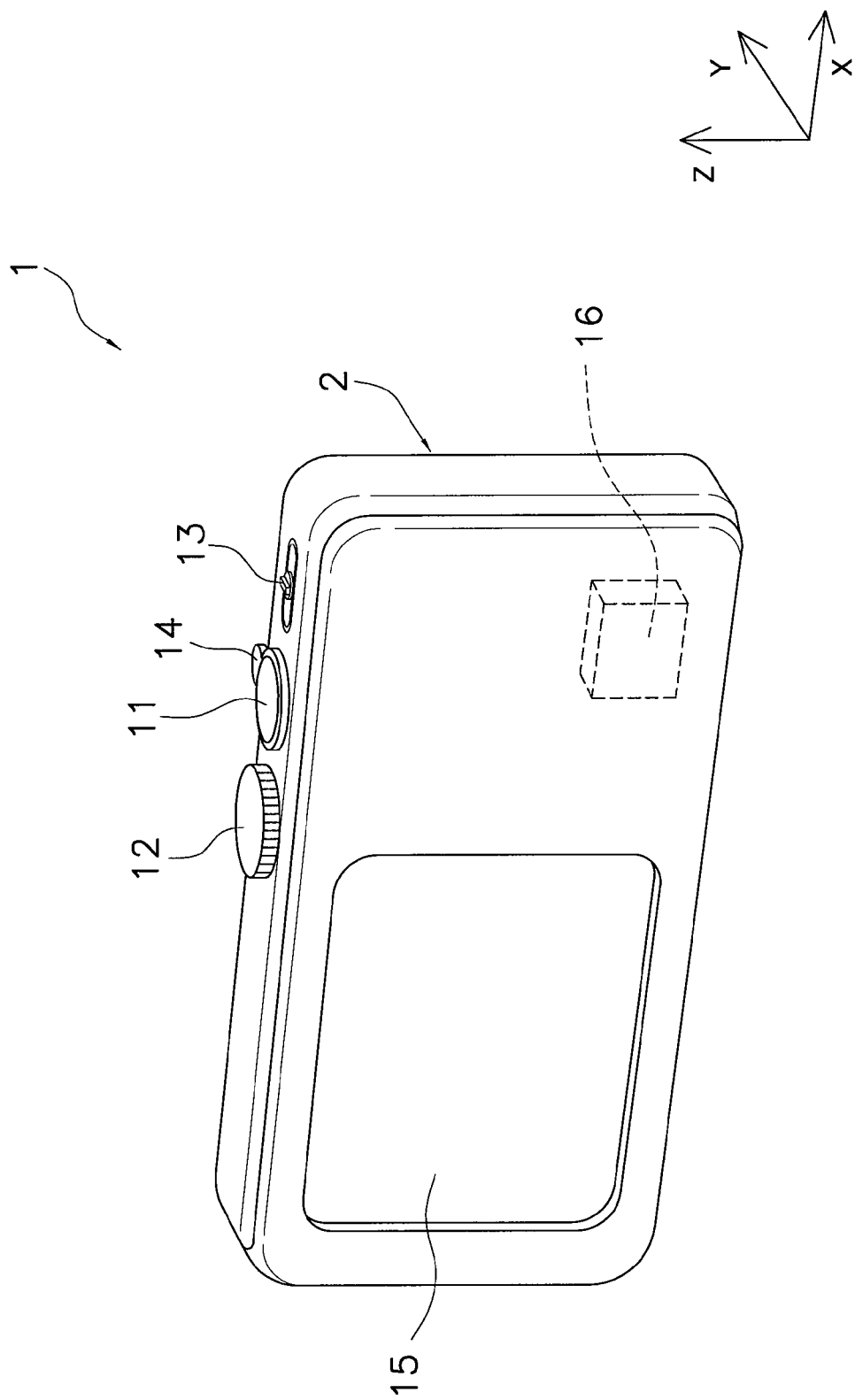
FIG. 2 is a schematic perspective view of a digital camera.

A digital camera 1 according to a preferred embodiment of the present invention will be described with reference to FIGS. 1 and 2. FIGS. 1 and 2 are schematic perspective views of the digital camera 1. FIG. 1 shows the situation when a lens barrel 3 is in an image capture state.

The digital camera 1 is a camera for acquiring an image of a subject. A multistage retractable lens barrel 3 is installed in the digital camera 1 in order to afford higher magnification and a more compact size.

In the following description, the six sides of the digital camera 1 are defined as follows.

The side that faces the subject when an image is captured with the digital camera 1 is called the front face, and the opposite side is called the rear face. When an image is captured such that the top and bottom of the subject in the vertical direction coincide with the short-side top and bottom of a rectangular image (generally with an aspect ratio (the ratio of the long side to the short side) of 3:2, 4:3, 16:9, etc.) captured by the digital camera 1, the side of the camera facing upward (vertically) is called the top face, and the opposite side is called the bottom face. Further, when an image is captured such that the top and bottom of the subject in the vertical direction coincide with the short-side top and bottom of a rectangular image captured by the digital camera 1, the side of the camera that is to the left when viewed from the subject side is called the left face, and the opposite side is called the right face. The above definitions are not intended to limit the orientation in which the digital camera 1 is used.

According to the above definitions, FIG. 1 is a perspective view of the front, top, and left faces.

In addition to the six sides of the digital camera 1, the six sides of the various constituent members disposed in the digital camera 1 are similarly defined. That is, the above definitions apply to the six sides of the various constituent members when they have been disposed in the digital camera 1.

Also, as shown in FIG. 1, there is defined a three-dimensional coordinate system (right-hand system) having a Y axis that is parallel to the optical axis A of an imaging optical system O (discussed below). With this definition, the direction from the rear face side toward the front face side along the optical axis A is the Y axis positive direction, the direction from the right face side toward the left face side perpendicular to the optical axis A is the X axis positive direction, and the direction from the bottom face side toward the top face side perpendicular to the X and Y axes is the Z axis positive direction.

This XYZ coordinate system will be referred to in the following description of the drawings. That is, the X axis positive direction, the Y axis positive direction, and the Z axis positive direction in the drawings indicate the same respective directions.

2. Overall Structure of a Digital Camera

As shown in FIGS. 1 and 2, the digital camera 1 mainly includes an outer case 2 that holds the various units, an imaging optical system O that forms an optical image of the subject, and a lens barrel 3 that movably supports the imaging optical system O.

The imaging optical system O is made up of a plurality of lens groups, and these lens groups are disposed in a state of being aligned in the Y axis direction. The lens barrel 3 has a multistage retractable configuration, and is supported by the outer case 2. The plurality of lens groups are supported by the lens barrel 3 to be relatively movable in the Y axis direction. The configuration of the lens barrel 3 will be described in detail below.

A CCD unit 21 serving as an imaging unit that subjects optical images to photoelectric conversion, and an image storing unit 16 that stores the images acquired by the CCD unit 21 are built into the outer case 2. A liquid crystal monitor 15 for displaying the images acquired by the CCD unit 21 is provided to the rear face of the outer case 2.

A shutter release button 11, a control dial 12, a power switch 13, and a zoom adjustment lever 14 are provided to the top face of the outer case 2 so that the user can capture images and perform other such operations. The shutter release button 11 is a button for inputting the exposure timing. The control dial 12 is a dial for making various settings related to image capture. The power switch 13 is used to switch the digital camera 1 on and off. The zoom adjustment lever 14 is used to adjust the zoom magnification, and can rotate over a specific angle range around the shutter release button 11.

FIGS. 1 and 2 show only the main configuration of the digital camera 1, and therefore components other than those discussed above may be provided to the digital camera 1.

3. Configuration of Lens Barrel

Figure 3:
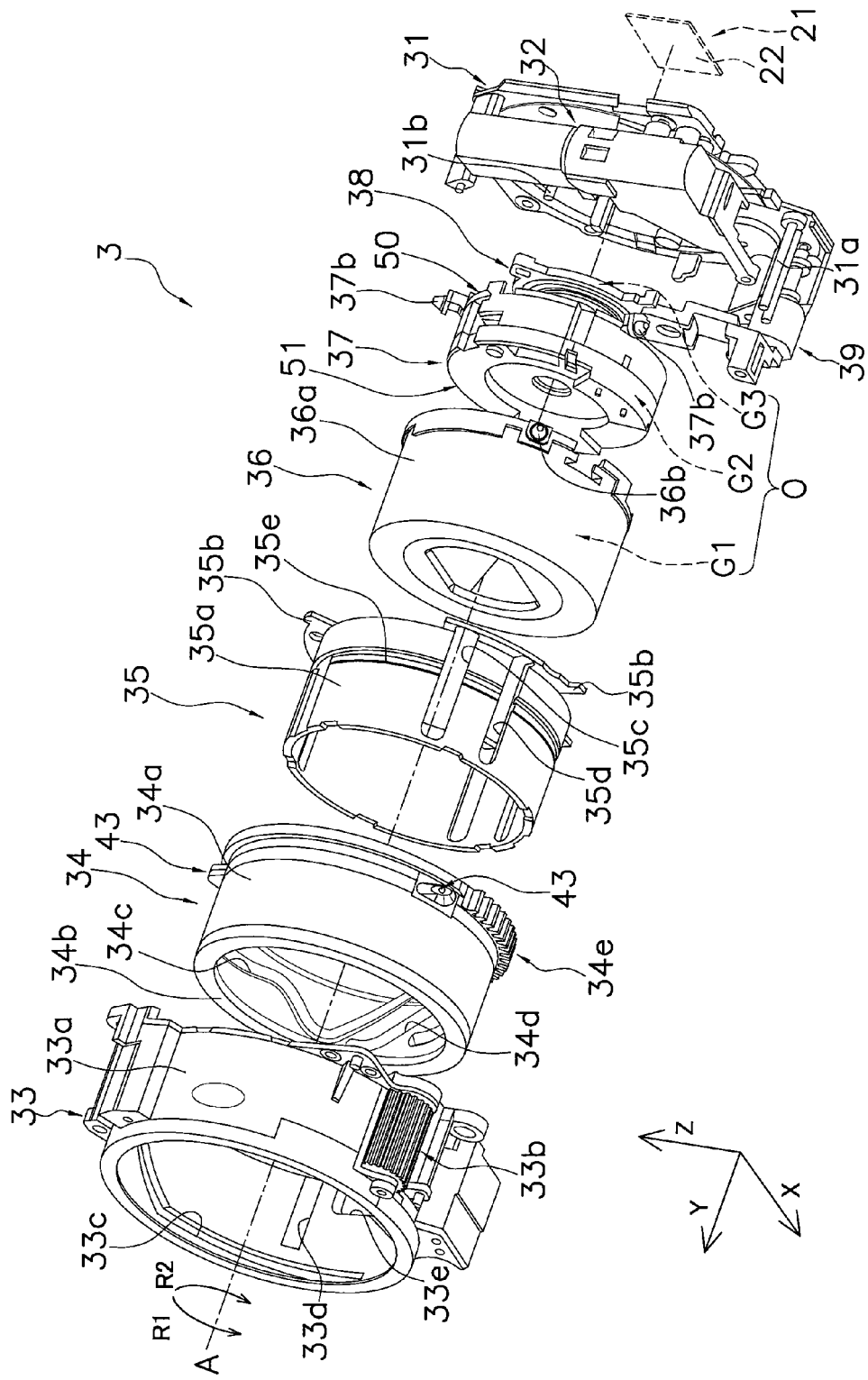
FIG. 3 is an exploded perspective view of a lens barrel.

The overall configuration of the lens barrel 3 will be described with reference to FIG. 3. FIG. 3 is an exploded perspective view of the lens barrel 3.

As shown in FIG. 3, the lens barrel 3 mainly includes a base plate 31 fixed to the outer case 2, a zoom motor 32 fixed to the base plate 31 and serving as a drive source, a stationary frame 33 that holds various frame members between itself and the base plate 31, a drive frame 34 to which the drive force of the zoom motor 32 is inputted, and a straight-movement frame 35 that is supported by the stationary frame 33 to be relatively movable in the Y axis direction. A CCD sensor 22 of the CCD unit 21 is attached to the base plate 31. An example of the zoom motor 32 is a stepping motor.

The lens barrel 3 further includes a first lens frame 36 that supports a first lens group G1, a second lens frame 37 that supports a second lens group G2, and a third lens frame 38 that supports a third lens group G3. The first lens group G1 is, for example, a lens group having negative power overall, and takes in light from the subject. The second lens group G2 is, for example, a lens group having positive power overall. The third lens group G3 is, for example, a lens group having positive power for adjusting the focal point. The imaging optical system O is made up of the first lens group G1, the second lens group G2, and the third lens group G3.

3.1. Stationary Frame

The stationary frame 33 is a member for guiding the drive frame 34, and makes up a member on the stationary side of the lens barrel 3 along with the base plate 31. The stationary frame 33 is fixed by screws to the base plate 31. The stationary frame 33 mainly includes a stationary frame main body 33a that makes up the main part, and a drive gear 33b that is rotatably supported by the stationary frame main body 33a.

The stationary frame main body 33a is fixed to the base plate 31, and the drive frame 34 is disposed inside the inner periphery thereof. The drive gear 33b is a member for transmitting the drive force of the zoom motor 32 to the drive frame 34, and meshes with a gear (not shown) of the zoom motor 32. Three cam grooves 33c for guiding the drive frame 34, and three straight-movement grooves 33d for guiding the straight-movement frame 35 are formed on the inner peripheral part of the stationary frame main body 33a. The cam grooves 33c are spaced equally in the circumferential direction. The straight-movement grooves 33d extend in the Y axis direction, and are spaced equally in the circumferential direction.

3.2. Drive Frame

The drive frame 34 is a member for guiding the first lens frame 36 and the second lens frame 37, and is disposed inside the inner periphery of the stationary frame 33. The drive frame 34 mainly includes a substantially cylindrical drive frame main body 34a that is disposed inside the inner periphery of the stationary frame main body 33a.

Three cam pins 43 are provided as cam members on the outer peripheral part of the drive frame main body 34a, and three first cam grooves 34c and three second cam grooves 34d are formed on the inner peripheral part. The first cam grooves 34c are grooves for guiding the first lens frame 36. The second cam grooves 34d are grooves for guiding the second lens frame 37. The three first cam grooves 34c are spaced equally in the circumferential direction. The three second cam grooves 34d are spaced equally in the circumferential direction. The three cam pins 43 are spaced equally in the circumferential direction, and engage with the three cam grooves 33c of the stationary frame 33. That is, the drive frame 34 is supported by the stationary frame 33 via the cam pins 43.

A gear portion 34e is formed on the outer peripheral part of the drive frame main body 34a. The gear portion 34e meshes with the drive gear 33b of the stationary frame 33. As a result, the drive force of the zoom motor 32 is transmitted through the drive gear 33b to the drive frame 34.

The drive frame 34 is driven around the optical axis A (the R1 direction and the R2 direction) by the drive force of the zoom motor 32. When the camera 1 changes from their retracted state to their image capture state, the drive frame 34 is driven to the R1 side by the zoom motor 32. As a result, the cam pins 43 move along the cam grooves 33c of the stationary frame 33, and the drive frame 34 moves to the Y axis direction positive side relative to the stationary frame 33. When the camera 1 changes from their image capture state to their retracted state, the drive frame 34 is driven to the R2 side by the zoom motor 32. As a result, the drive frame 34 moves to the Y axis direction negative side relative to the stationary frame 33.

Thus, the drive frame 34 is movable in the Y axis direction while rotating relative to the stationary frame 33, according to the shape of the cam grooves 33c.

3.3. Straight-Movement Frame

The straight-movement frame 35 is a member for preventing the rotation of the first lens frame 36 relative to the stationary frame 33, and is disposed inside the inner periphery of the drive frame 34. The straight-movement frame 35 mainly includes a cylindrical straight-movement frame main body 35a and three straight-movement pins 35b formed on the outer peripheral part of the straight-movement frame main body 35a.

The straight-movement pins 35b are disposed on the Y axis direction negative side of the straight-movement frame main body 35a so as not to interfere with the drive frame 34, and engage with the straight-movement grooves 33d in the stationary frame 33. That is, the straight-movement frame 35 is supported by the stationary frame 33 to be relatively straight movable in the Y axis direction.

A bayonet groove 35e is formed on the outer peripheral part of the straight-movement frame main body 35a. A bayonet tab 34f (not shown) formed on the inner peripheral part of the drive frame 34 engages with the bayonet groove 35e. This allows the straight-movement frame 35 to rotate relative to the drive frame 34 and to move integrally in the Y axis direction.

Specifically, when the drive frame 34 rotates relative to the stationary frame 33, the straight-movement frame 35 moves along with the drive frame 34 in the Y axis direction without rotating relative to the stationary frame 33 (while rotating relative to the drive frame 34).

Three first guide grooves 35c and three second guide grooves 35d that extend in the Y axis direction are formed in the straight-movement frame main body 35a. The three first guide grooves 35c are spaced equally in the circumferential direction, and the three second guide grooves 35d are spaced equally in the circumferential direction. Cam pins 36b (discussed below) of the first lens frame 36 are inserted in the first guide grooves 35c. Cam pins 37b (discussed below) of the second lens frame 37 are inserted in the second guide grooves 35d. That is, the rotation of the first lens frame 36 and the second lens frame 37 relative to the stationary frame 33 is restricted by the straight-movement frame 35. Furthermore, movement of the first lens frame 36 and the second lens frame 37 in the Y axis direction is not restricted by the first guide grooves 35c and the second guide grooves 35d.

3.4. First Lens Frame

The first lens frame 36 is a member supporting the first lens group G1 to be relatively movable in the Y axis direction, and is disposed inside the inner periphery of the straight-movement frame 35. The first lens frame 36 mainly includes a first lens frame main body 36a in the interior of which is held the first lens group G1, and the three cam pins 36b provided on the outer peripheral part of the first lens frame main body 36a. The cam pins 36b are passed through the first guide grooves 35c and engage with the first cam grooves 34c of the drive frame 34.

When the drive frame 34 rotates relative to the stationary frame 33, the cam pins 36b move along the first cam grooves 34c. The movement of the cam pins 36b in the rotary direction here is restricted by the first guide grooves 35c of the straight-movement frame 35. Therefore, the cam pins 36b move only in the Y axis direction along the first cam grooves 34c and the first guide grooves 35c. Thus, the first lens frame 36 is movable in the Y axis direction relative to the drive frame 34 according to the shape of the first cam grooves 34c, without rotating relative to the stationary frame 33.

3.5. Second Lens Frame

The second lens frame 37 is a member supporting the second lens group G2 to be relatively movable in the Y axis direction, and is disposed inside the inner periphery of the straight-movement frame 35 and on the Y axis direction negative side of the first lens frame 36. The second lens frame 37 mainly includes a first frame 50 and second frame 59 in the interior of which is held the second lens group G2, and the three cam pins 37b provided on the outer peripheral part of the first frame 50. The cam pins 37b are passed through the second guide grooves 35d and engage with the second cam grooves 34d of the drive frame 34.

When the drive frame 34 rotates relative to the stationary frame 33, the cam pins 37b move along the second guide grooves 35d. The movement of the cam pins 37b here in the rotational direction is restricted by the second guide grooves 35d of the straight-movement frame 35. Therefore, just as with the first lens frame 36, the cam pins 37b move only in the Y axis direction along the second cam grooves 34d and the second guide grooves 35d.

Thus, the second lens frame 37 is movable in the Y axis direction relative to the drive frame 34 according to the shape of the second cam grooves 34d, without rotating relative to the stationary frame 33.

3.6. Third Lens Frame

The third lens frame 38 is a member supporting the third lens group G3 to be relatively movable in the Y axis direction, and is supported by focus shafts 31a and 31b of the base plate 31 to be relatively movable in the Y axis direction. The third lens frame 38 is driven by a focus motor 39 fixed to the base plate 31. The focus motor 39 moves the third lens frame 38 in the Y axis direction relative to the base plate 31.

3.7. Summary

To summarize the above configuration, the first lens frame 36 and the second lens frame 37 can be moved in the direction along the optical axis A by the zoom motor 32 via the stationary frame 33, the drive frame 34, and the straight-movement frame 35. The third lens frame 38 can be moved in the direction along the optical axis A by the focus motor 39.

Therefore, this configuration results in a retractable lens barrel 3 that allows adjustment of the focus and the zoom magnification of the imaging optical system O.

4. Cylindrical Molded Article and Injection Mold

Figures 4A, 4B:
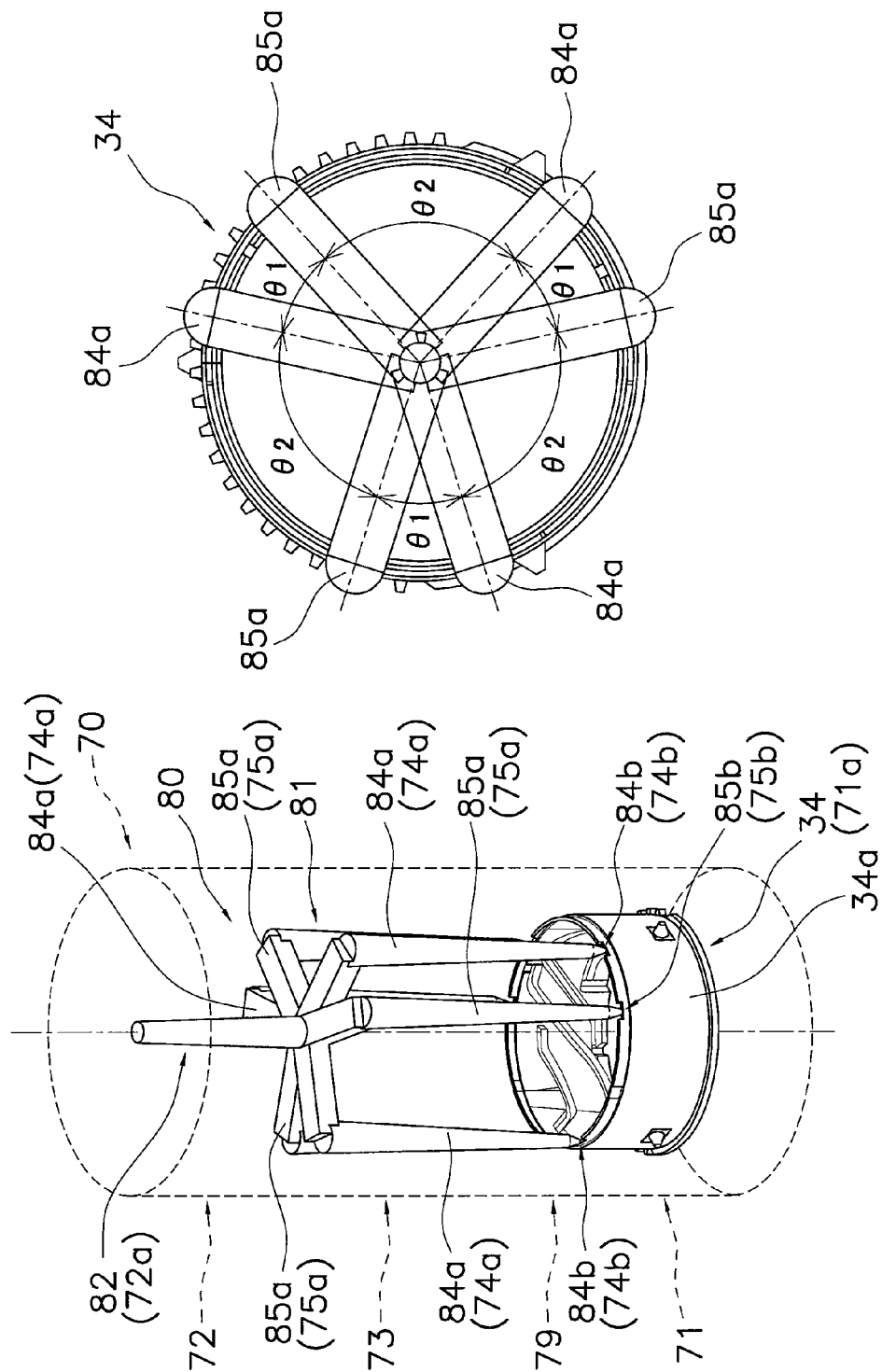
FIGS. 4A and 4B are schematic diagrams of a molded article and an injection mold.

The cylindrical molded article and the injection mold according to this embodiment will be described. Here, a drive frame 34 will be described as an example of a molded article. FIGS. 4A and 4B are schematic diagrams of a molded article 80 and an injection mold 70. FIG. 4A is a schematic perspective view of the molded article 80 and the injection mold 70, while FIG. 4B is a plan view of the molded article 80 as seen in the axial direction.

4.1. Molded Article

As shown in FIG. 4A, the molded article 80 is made from a synthetic resin removed from the mold 70 after injection molding. Example of the synthetic resin is a polycarbonate or other such a thermoplastic resin. The molded article 80 mainly includes the drive frame 34 (as a cylindrical molded article) and a channel portion 81. The channel portion 81 is cut off of the drive frame 34 after injection molding. As discussed above, a total of six cam grooves (the first cam grooves 34c and the second cam grooves 34d) are formed on the inner peripheral part of the drive frame 34.

The channel portion 81 is a portion formed by a channel in the injection mold 70 during injection molding, and includes a sprue portion 82, three first runner portions 84a linked to the sprue portion 82, three first gate portions 84b, three second runner portions 85a linked to the sprue portion 82, and three second gate portions 85b. The first gate portions 84d and second gate portions 85b are disposed on an annular end face formed in the drive frame 34 and directed to the axial direction. The channel portion 81 has six gate portions (the first gate portions 84d and second gate portions 85b).

4.2. Injection Mold

The injection mold 70 is a metal mold used for injection molding, and mainly includes a first portion 71, a second portion 72, a third portion 73, and a fourth portion 79. The mold 70 is made up of a plurality of parts, but the first portion 71 to the fourth portion 79 are divided in the sense of being portions having different functions. Therefore, the portions 71 to 73 and 79 are not limited to being made up of different parts.

A cavity 71a for forming the drive frame 34 is formed in the first portion 71. The cavity 71a is defined by combining two mold parts (not shown), for example. The drive frame 34 is molded in the cavity 71a.

A sprue 72a through which the molten molding material is injected from the injection apparatus (not shown) is formed in the second portion 72. For instance, the sprue 72a is defined by a cylindrical sprue bush (not shown). The sprue portion 82 is molded in the sprue 72a.

Three first runners 74a and three second runners 75a that are connected to the sprue 72a are formed in the third portion 73. Three first gates 74b and three second gates 75b are formed in the fourth portion 79. One end of the first runners 74a is connected to the sprue 72a, and the other end is connected to the first gates 74b. One end of the second runners 75a is connected to the sprue 72a, and the other end is connected to the second gates 75b. The first runner portions 84a and the second runner portions 85a are molded in the first runners 74a and the second runners 75a, and the first gate portions 84b and the second gate portions 85b are molded in the first gates 74b and the second gates 75b.

4.3. Gate Portions

Figure 5:
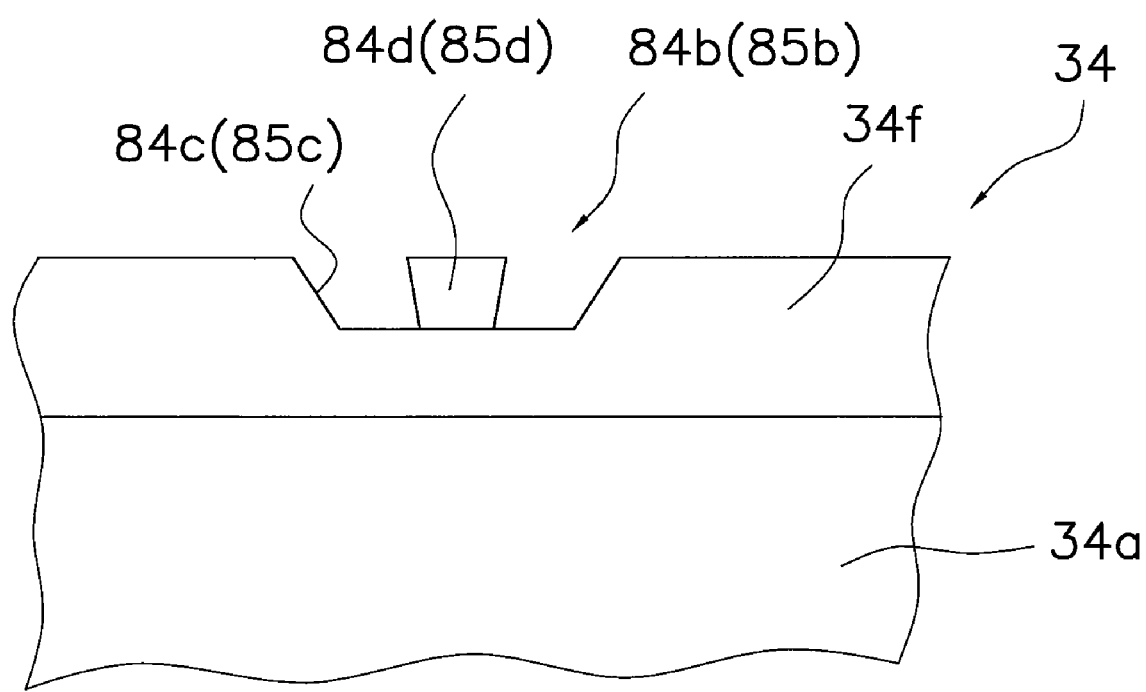
FIG. 5 is a detail view of the area around the gate portions.

The first gate portions 84b and the second gate portions 85b will be described through reference to FIG. 5. FIG. 5 is a detailed diagram of the area around the gate portions.

As shown in FIG. 5, the first gate portions 84b and the second gate portions 85b are vestiges of the first gates 74b and the second gates 75b during injection molding, and after the channel portion 81 is cut off, these are included in part of the drive frame 34. An annular portion 34f whose walls are thinner than those of the drive frame main body 34a is formed at the end of the drive frame main body 34a on the Y axial direction positive side. Three first recesses 84c and three second recesses 85c are formed in the annular portion 34f. First protrusions 84d extend in the axial direction from the first recesses 84c. Second protrusions 85d extend in the axial direction from the second recesses 85c. The first protrusions 84d and the second protrusions 85d are held in the axial direction in the first recesses 84c and the second recesses 85c.

Depending on how the channel portion 81 is cut off, the first protrusions 84d and second protrusions 85d may not remain. In this case, the first gate portions 84b are made up of the first recesses 84c, and the second gate portions 85b are made up of the second recesses 85c.

4.4. Disposition of Gate Portions

Figure 6:
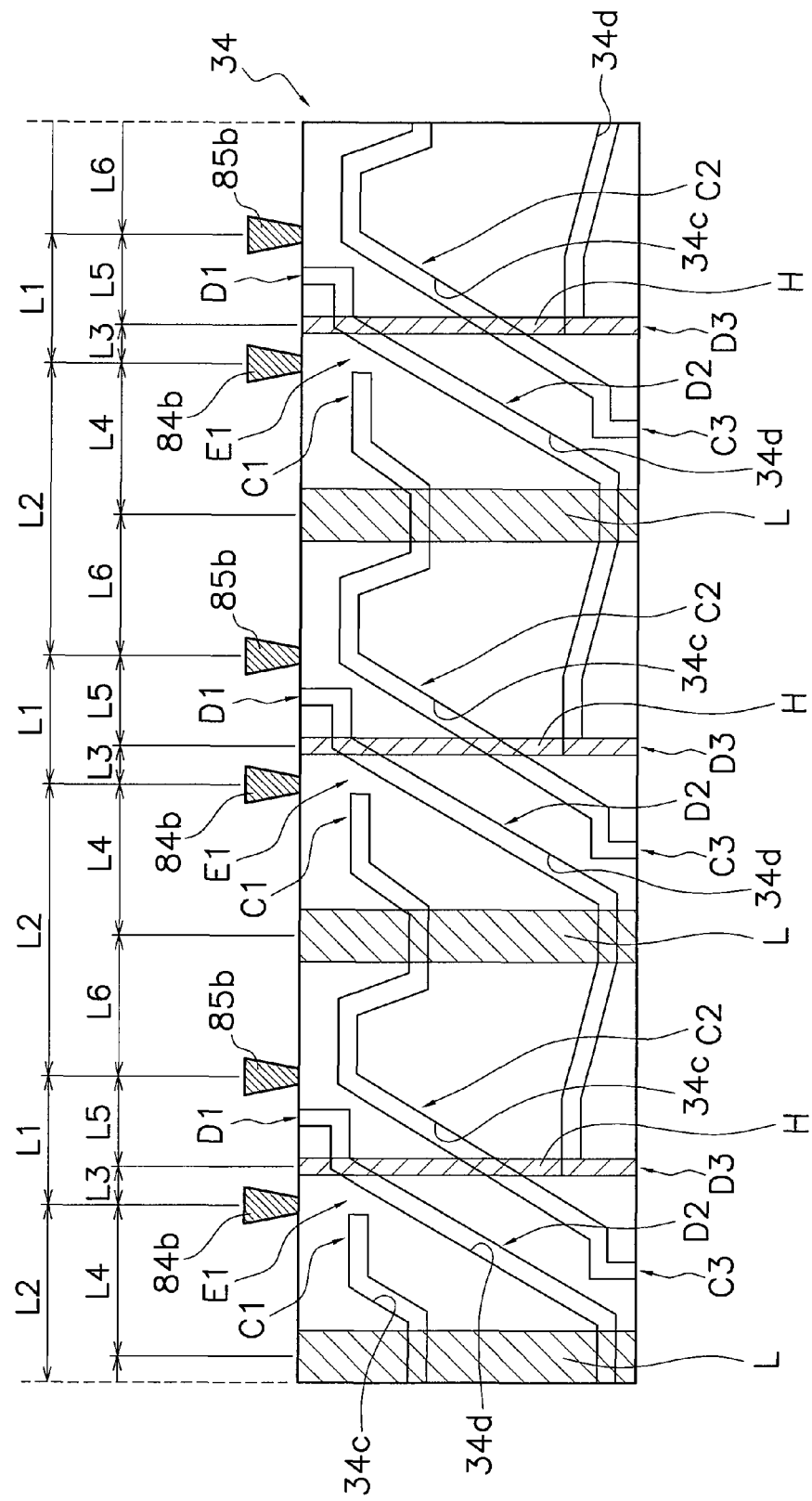
FIG. 6 is a development view of the inner peripheral side of a drive frame.

The drive frame 34 is characterized by the disposition of the first gate portions 84b and the second gate portions 85b. The disposition of the first gate portions 84b and the second gate portions 85b will be described through reference to FIG. 6. FIG. 6 is a development view of the inner peripheral side of the drive frame 34. Here, the disposition will be described using the constitution of the molded article 80, but since the constitution of the molded article 80 corresponds to the constitution of the metal mold 70, the following description can be considered to apply to the mold 70 as well, and not just to the molded article 80.

As shown in FIGS. 4A, 4B, and 6, the three first gate portions 84b are disposed at a constant pitch in the circumferential direction, and the three second gate portions 85b are disposed at a constant pitch in the circumferential direction. However, the first gate portions 84b and the second gate portions 85b are disposed at an irregular pitch. Specifically, each of the first gate portions 84b is disposed at a location closer to the R2-side second gate portion 85b (the other second gate portion) than to the R1-side second gate portion 85b (the one second gate portion). More specifically, the distance L1 between the first gate portion 84b and the R1-side second gate portion 85b (the other second gate portion) in the circumferential direction is shorter than the distance L2 between the first gate portion 84b and the R2-side second gate portion 85b (the one second gate portion). As shown in FIG. 4B, the angle θ1 between the first gate portion 84b and the R1 side second gate portion 85b is smaller than the angle θ2 between the first gate portion 84b and the R2-side second gate portion 85b. Here, the distances L1 and L2 and the angles θ1 and θ2 are based on the center of each part in the circumferential direction.

The three first cam grooves 34c and the three second cam grooves 34d are formed on the inner peripheral part of the drive frame 34. The three first cam grooves 34c all have the same shape and are disposed at a constant pitch in the circumferential direction. The three second cam grooves 34d all have the same shape and are disposed at a constant pitch in the circumferential direction. The first cam grooves 34c and the second cam grooves 34d are alternately disposed in the circumferential direction so as not to cross each other.

The first cam grooves 34c each include a first cam groove main body C2 and a first conducting groove C3 formed at one end of the first cam groove main body C2. The first conducting groove C3 extends in the axial direction, and passes through the end of the drive frame main body 34a. The other end C1 of the first cam groove main body C2 does not pass through in the axial direction.

The second cam grooves 34d each include a second cam groove main body D2, a second conducting groove D1 formed at one end of the second cam groove main body D2, and a third conducting groove D3 formed at the other end of the second cam groove main body D2. The second conducting groove D1 and the third conducting groove D3 extend in the axial direction, and pass through the end of the drive frame main body 34a.

In this embodiment, the first cam grooves 34c have the same width from the end C1 to the first conducting groove C3. The second cam grooves 34d have the same width from the second conducting groove D1 to the third conducting groove D3. Also, the first cam grooves 34c and the second cam grooves 34d have the same width.

The drive frame 34 does not have a constant wall thickness because of the first cam grooves 34c and the second cam grooves 34d. More specifically, on the inner peripheral face of the drive frame 34 there are three high-density regions H in which the proportion accounted for by the cam grooves is highest, and three low-density regions L in which the proportion accounted for by the cam grooves is lowest. The three high-density regions H are disposed at a constant pitch in the circumferential direction. The three low-density regions L are disposed at a constant pitch in the circumferential direction.

The high-density regions H are regions in which there is the highest proportion of the axial direction dimension accounted for by the first cam grooves 34c and the second cam grooves 34d with respect to the axial direction dimension of the drive frame 34, on the inner peripheral face of the drive frame 34. The low-density regions L are regions in which there is the lowest proportion of the axial direction dimension accounted for by the first cam grooves 34c and the second cam grooves 34d with respect to the axial direction dimension of the drive frame 34, on the inner peripheral face of the drive frame 34. As shown in FIG. 6, the high-density regions H coincide with the region in which the third conducting groove D3 extends in the axial direction. The low-density regions L coincide with the region in which the first cam grooves 34c and the second cam grooves 34d extend in the circumferential direction.

Figure 7:
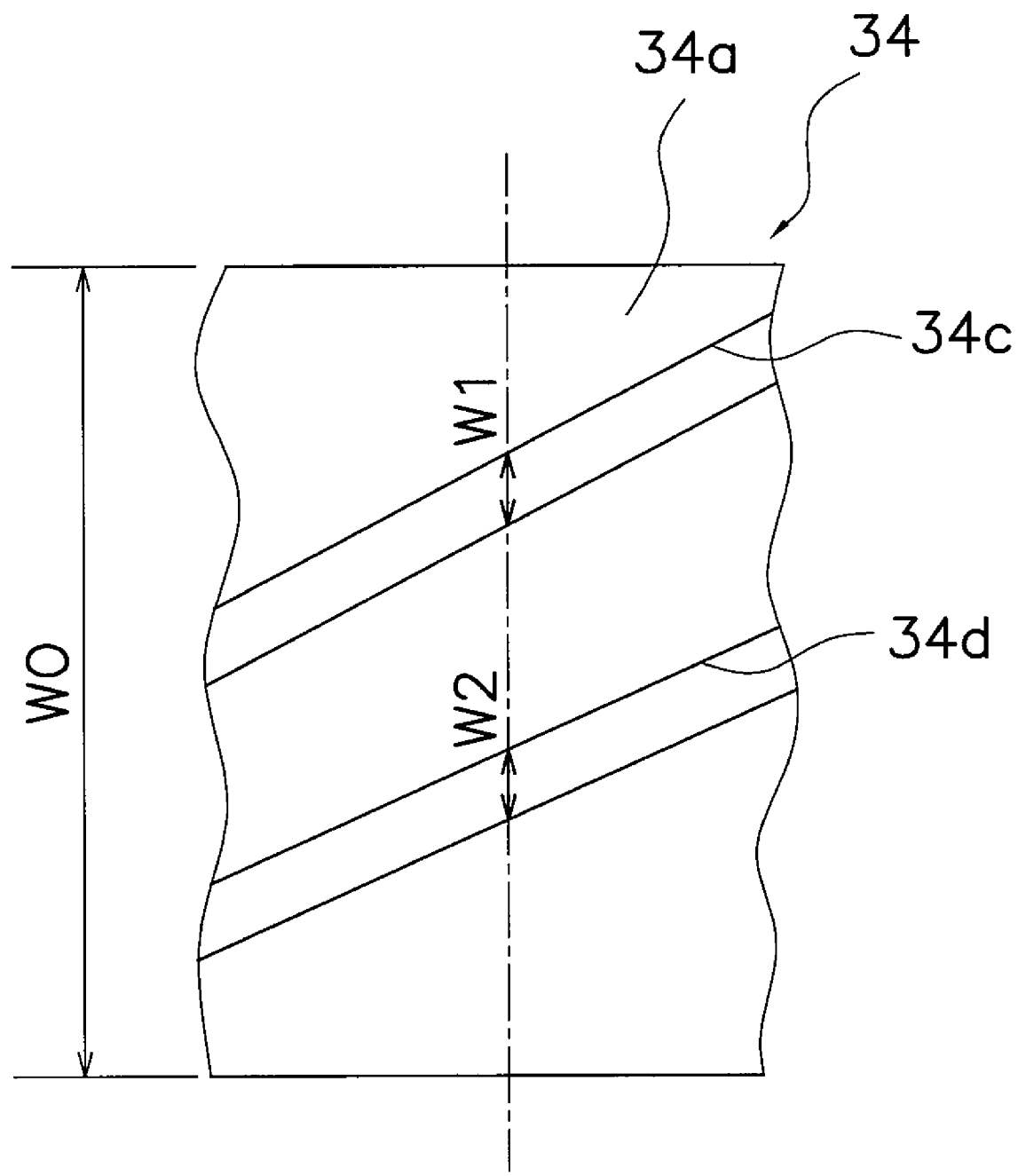
FIG. 7 is a diagram of the method for determining the high-density regions and low-density regions.

The method for determining the high-density regions H and the low-density regions L will be described. As shown in FIG. 7, let us assume a case in which two grooves are formed, a first cam groove 34c and a second cam groove 34d. We will let W0 be the axial direction dimension of the drive frame 34 (more specifically, the drive frame main body 34a), W1 the axial direction dimension of the first cam groove 34c, and W2 the axial direction dimension of the second cam groove 34d. In this case, P, which is "the proportion of the axial direction dimension accounted for by the first cam grooves 34c and the second cam grooves 34d with respect to the axial direction dimension of the drive frame 34," is expressed by P=(W1+W2)/W0. The clusters of lines where the proportion P is highest are the high-density regions H, and the clusters of lines where the proportion P is lowest are the low-density regions L.

The gate portions and the cam grooves will now be described in detail.

As shown in FIG. 6, the first gate portions 84b and the second gate portions 85b are disposed in the vicinity of the high-density regions H. More specifically, the first gate portions 84b are disposed between the high-density regions H and the low-density regions L in the circumferential direction. The first gate portions 84b are disposed at a location closer to the high-density regions H than to the low-density regions L. The second gate portions 85b are disposed between the high-density regions H and the low-density regions L in the circumferential direction. The second gate portions 85b are disposed at a location closer to the high-density regions H than to the low-density regions L.

Also, as shown in FIG. 6, the distance L3 between the first gate portions 84b and the high-density regions H in the circumferential direction is less than the distance L4 between the first gate portions 84b and the low-density regions L. The distance L5 between the second gate portions 85b and the high-density regions H in the circumferential direction is less than the distance L6 between the second gate portions 85b and the low-density regions L. Furthermore, the distance L3 between the first gate portions 84b and the high-density regions H is less than the distance L5 between the second gate portions 85b and the high-density regions H. Here, the distances L3 to L6 are based on the center of each part in the circumferential direction.

Also, as shown in FIG. 6, the first gate portions 84b are disposed at a location corresponding to a thick portion E1 formed between the end C1 of the first cam grooves 34c and the second cam groove main body D2 in the circumferential direction. The result is that the molding material that flows from the first gate portions 84b (more specifically, the first gates 74b) passes between the end C1 and the second cam groove main body D2, which increases the fluidity of the molding material.

As discussed above, with this molded article 80, gates are disposed predominantly in the vicinity of the high-density regions H, and therefore even if the flow resistance of the molding material is high, the pressure of the molding material in the vicinity of the high-density regions H will rise, making it easy for the molding material to flow into the high-density regions H.

5. Operation of Digital Camera

The operation of the digital camera 1 will be described with reference to FIGS. 1 to 3.

5.1. When Power is Off When the power switch 13 is in its off position, the lens barrel 3 is stopped in its retracted position (the state in which the lens barrel 3 is at its shortest in the Y axis direction), so that the lens barrel 3 will fit within the external dimensions of the outer case 2 in the Y axis direction.

5.2. When Power is On

When the power switch 13 is switched on, power is supplied to the various units, and the lens barrel 3 is driven from its retracted state to its image capture state. More specifically, the drive frame 34 is driven by the zoom motor 32 by a specific angle to the R1 side relative to the stationary frame 33. As a result, the drive frame 34 moves to the Y axis direction positive side relative to the stationary frame 33 while rotating relative to the stationary frame 33 according to the shape of the cam grooves 33c.

When the drive frame 34 rotates and moves straight relative to the stationary frame 33, the first lens frame 36 and the second lens frame 37 move along with the drive frame 34 to the Y axis direction positive side relative to the stationary frame 33. The first lens frame 36 and the second lens frame 37 do not rotate relative to the stationary frame 33 at this point.

The first lens frame 36 and the second lens frame 37 move along with the drive frame 34 to the Y axis direction positive side while moving in the Y axis direction relative to the drive frame 34 according to the shape of the first cam grooves 34c and the second cam grooves 34d. At this time the first lens frame 36 and the second lens frame 37 move relatively in the Y axis direction. Specifically, the first lens frame 36 and the second lens frame 37 move in the Y axis direction relative to the stationary frame 33 by an amount that is larger (or smaller) than the amount of movement of the drive frame 34 in the Y axis direction.

When the rotation of the drive frame 34 is stopped, movement of the first lens frame 36 and the second lens frame 37 in the Y axis direction also stops, and the lens barrel 3 is in its image capture state.

5.3. Zoom Operation During Image Capture

When the zoom adjustment lever 14 is operated to the telephoto side, the drive frame 34 is driven by the zoom motor 32 to the R1 side relative to the stationary frame 33, according to the rotational angle and operation duration of the zoom adjustment lever 14. As a result, the drive frame 34, the first lens frame 36, and the second lens frame 37 move together to the Y axis direction positive side relative to the stationary frame 33, and the zoom magnification of the imaging optical system O is increased.

When the zoom adjustment lever 14 is operated to the wide-angle side, the drive frame 34 is driven by the zoom motor 32 to the R2 side relative to the stationary frame 33, according to the rotational angle and operation duration of the zoom adjustment lever 14. As a result, the drive frame 34, the first lens frame 36, and the second lens frame 37 move together to the Y axis direction negative side relative to the stationary frame 33, and the zoom magnification of the imaging optical system O is decreased.

If heat shrinkage during injection molding causes the drive frame 34 to deform, a gap will be produced between the first cam grooves 34c and the cam pins 36b, or the first cam grooves 34c and the cam pins 36b will interfere with each other in the radial direction. Consequently, in the above-mentioned zoom operation, the position of the first lens frame 36 in the direction perpendicular to the optical axis A will become unstable, or the zoom drive of the first lens frame 36 will be hindered. The same applies to the second lens frame 37. Therefore, the dimensional precision of the drive frame 34 or other such cylindrical molded article is extremely important to the drive performance and optical performance of the lens barrel 3.

6. Characteristics

The following are characteristics of the molded article 80, the lens barrel 3, the digital camera 1, and the injection mold 70.

6.1.

With this molded article 80, the first gate portions 84b and the second gate portions 85b are disposed at an irregular pitch so that the first gate portions 84b and the second gate portions 85b will be closer to the high-density regions H. Therefore, the pressure of the molding material in the vicinity of the high-density regions H in injection molding can be higher than in the past, and the molding material will readily flow into the high-density regions H in injection molding. As a result, there tends to be less deformation of the molded article 80 (more specifically, the drive frame 34 (cylindrical molded article)) caused due to heat shrinkage in the pressure-holding cooling step than in the past.

Figures 8A, 8B:
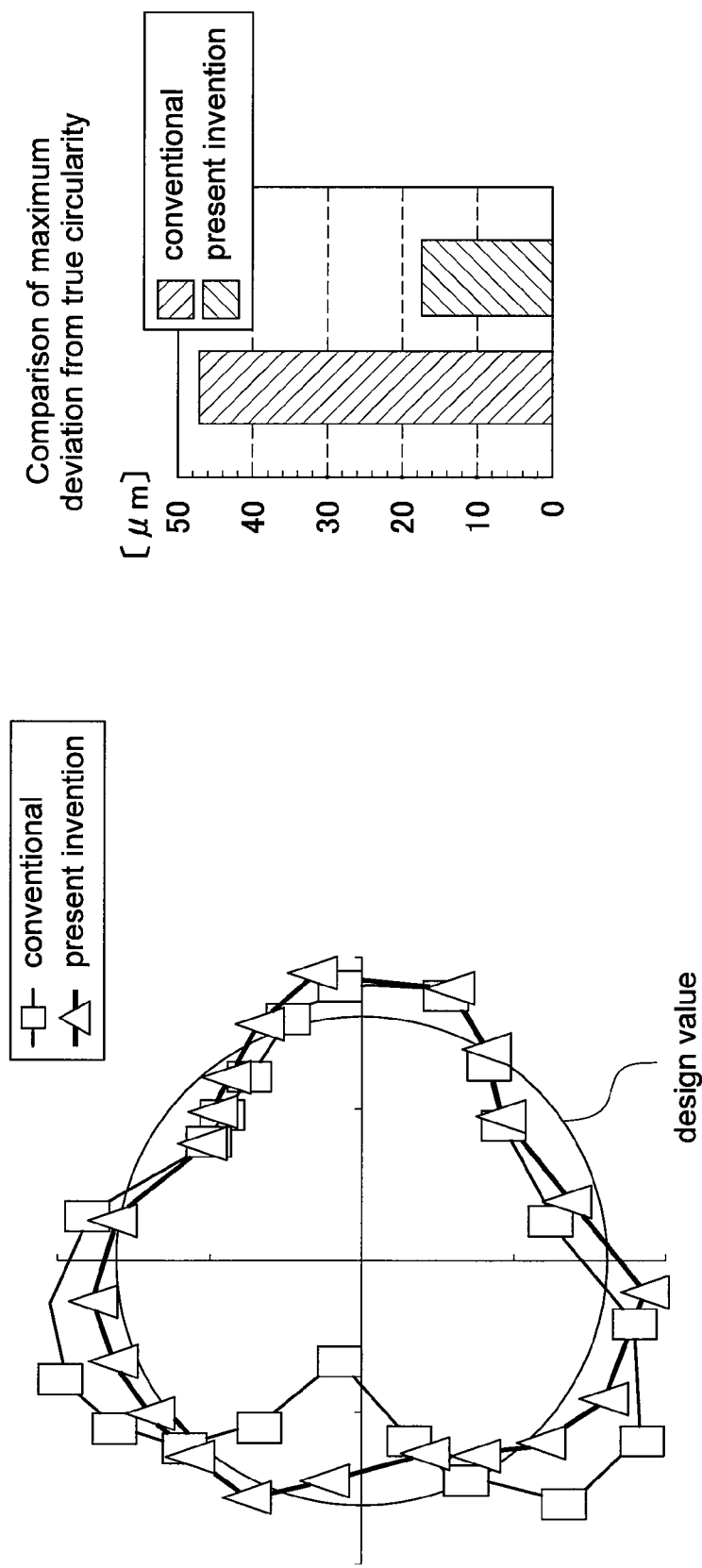
FIGS. 8A and 8B are comparative diagrams of prior art and the present invention.

The dimensional precision of the molded article 80 will now be described. FIG. 8A is a comparative diagram of the circularity, while FIG. 8B is a comparative graph of the maximum amount of deviation in circularity. The "conventional" molded article refers to one in which six gates are disposed at a constant pitch. These data are the result of measuring the actual dimensions of the molded articles.

As shown in FIG. 8, with the conventional molded article, there was deformation such that the high-density regions H moved inward in the radial direction, and there was deformation such that the regions between the high-density regions H (the low-density regions L) were pushed outward in the radial direction. Consequently, the conventional cylindrical molded article had low circularity, and the maximum amount of deviation in circularity was about 47 μm.

Meanwhile, with the molded article 80, there was less deformation of the high-density regions H than with the conventional molded article, and circularity was higher. The maximum amount of deviation in circularity was about 17 μm.

That is, the gate locations are predominantly disposed in the vicinity of the high-density regions H, which reduces the maximum amount of deviation in circularity to about one-third, and improves circularity. It can be seen from the above results that the gate locations employed in the molded article 80 and the injection mold 70 are effective.

As discussed above, with this molded article 80, the amount of deformation of the cylindrical molded article formed in the initial metal mold 70 is smaller than with the conventional molded article, and dimensional precision can be increased without increasing the number of mold corrections. That is, with this molded article 80, dimensional precision can be increased while the manufacturing cost is lowered.

6.2.

With the molded article 80 and the injection mold 70, the first gate portions 84b and the second gate portions 85b are disposed at a location closer to the high-density regions H than to the low-density regions L, and therefore the molding material flows even more readily into the high-density regions H.

6.3.

As discussed above, the drive frame 34 or other such molded article 80 with increased dimensional precision is used for this lens barrel 3, and therefore the positional precision of the lens group is higher and the optical performance of the imaging optical system O can be improved. Also, with this digital camera 1, since the optical performance of the imaging optical system O is higher, the quality of an acquired image is improved.

7. Other Embodiments

The cylindrical molded article, lens barrel, camera, and injection mold according to the present invention are not limited to the above embodiment, and various modifications and alterations are possible without departing from the gist of the present invention.

7.1.

In the above embodiment, the first gate portions 84b and the second gate portions 85b were provided at a total of six places, but the number of gate portions is not limited to this, and the present invention can be applied to cases when there are more or fewer than six gate portion locations.

7.2.

In the above embodiment, the cam grooves were formed on the inner peripheral part of the drive frame 34, but the present invention can also be applied when the cam grooves are formed on the outer peripheral part, or when the cam grooves are formed on both the inner peripheral part and the outer peripheral part. Also, the number, shape, disposition, and so forth of the cam grooves are not limited to the embodiment given above.

7.3.

In the above embodiment, the gate portions were formed on the end face of the drive frame 34 in the axial direction, but the disposition of the gate portions is not limited to this. For example, gate portions may be provided on the inner peripheral side or the outer peripheral side of the drive frame 34.

7.4.

In the above embodiment, the high-density regions H and the low-density regions L were regions having a certain surface area, but are not limited to this. For instance, the high-density regions H and the low-density regions L may instead be lines extending in the axial direction.

7.5.

Conceivable devices in which the above-mentioned lens barrel 3 is installed include digital cameras that allow moving or still pictures to be captured, film cameras that make use of silver halide film, and so forth. In any case, the effect will be the same as that in the embodiments given above.

General Interpretation of Terms

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A cylindrical molded article formed by injection molding, comprising:
   a cylindrical portion;
   at least three cam grooves formed in either the inner peripheral part or the outer peripheral part of the cylindrical portion;
   three first gate portions formed at an end of the cylindrical portion as vestiges of gates in injection molding; and
   three high-density regions on the faces where the cam grooves are formed, in which there is the highest proportion of the axial direction dimension accounted for by the three or more cam grooves with respect to the axial direction dimension of the cylindrical portion,
   wherein the first gate portions are disposed at a location closer to one of two adjacent high-density regions than the other of the two adjacent high-density regions in the circumferential direction.

2. The cylindrical molded article according to claim 1,
   further comprising three second gate portions that are formed at an end of the cylindrical portion as vestiges of gates in injection molding,
   wherein the second gate portions are disposed at a location closer to one of two adjacent high-density regions than the other in the circumferential direction of the two adjacent high-density regions.

3. The cylindrical molded article according to claim 2,
   wherein the first gate portions are disposed at a location closer to one of two adjacent second gate portions than the other in the circumferential direction of the two adjacent second gate portions.

4. The cylindrical molded article according to claim 3,
   wherein the high-density regions are disposed in the circumferential direction between the first gate portions and one of the two adjacent second gate portions.

5. The cylindrical molded article according to claim 3,
   further comprising three low-density regions on the faces where the cam grooves are formed, in which there is the lowest proportion of the axial direction dimension accounted for by the three or more cam grooves with respect to the axial direction dimension of the cylindrical portion,
   wherein the first gates are disposed at a location closer to the high-density regions than to the low-density regions in the circumferential direction between adjacent high-density regions and low-density regions.

6. The cylindrical molded article according to claim 4,
   further comprising three low-density regions on the faces where the cam grooves are formed, in which there is the lowest proportion of the axial direction dimension accounted for by the three or more cam grooves with respect to the axial direction dimension of the cylindrical portion,
   wherein the first gate portions are disposed at a location closer to the high-density regions than to the low-density regions in the circumferential direction between adjacent high-density regions and low-density regions.

7. A lens barrel supporting an imaging optical system, comprising:
the cylindrical molded article according to claim 6; and
a lens frame to which are fixed the lens group included in the imaging optical system, and which has at least three cam pins that engage with the cam grooves.

8. A camera, comprising:
the lens barrel according to claim 7;
an imaging optical system supported by the lens barrel;
an imaging unit for capturing an optical image of a subject formed by the imaging optical system; and
an outer case supporting the lens barrel.

9. The cylindrical molded article according to claim 2, wherein the high-density regions are disposed in the circumferential direction between the first gate portions and the other of the two adjacent second gate portions.

10. The cylindrical molded article according to claim 9, further comprising three low-density regions on the faces where the cam grooves are formed, in which there is the lowest proportion of the axial direction dimension accounted for by the three or more cam grooves with respect to the axial direction dimension of the cylindrical portion,
wherein the first gates are disposed at a location closer to the high-density regions than to the low-density regions in the circumferential direction between adjacent high-density regions and low-density regions.

11. The cylindrical molded article according to claim 2, further comprising three low-density regions on the faces where the cam grooves are formed, in which there is the lowest proportion of the axial direction dimension accounted for by the three or more cam grooves with respect to the axial direction dimension of the cylindrical portion,
wherein the first gates are disposed at a location closer to the high-density regions than to the low-density regions in the circumferential direction between adjacent high-density regions and low-density regions.

12. The cylindrical molded article according to claim 1, further comprising three low-density regions on the faces where the cam grooves are formed, in which there is the lowest proportion of the axial direction dimension accounted for by the three or more cam grooves with respect to the axial direction dimension of the cylindrical portion,
wherein the first gates are disposed at a location closer to the high-density regions than to the low-density regions in the circumferential direction between adjacent high-density regions and low-density regions.

13. An injection mold for injection molding a molding material to obtain a cylindrical molded article having at least three cam grooves, comprising:
a first portion having a cavity arranged to mold the cylindrical molded article;
a second portion having a sprue as a channel through which the molding material is injected;
a third portion having three first runners connected to the sprue; and
a fourth portion having three first gates that connect the cavity and the three first runners,
wherein the first portion has three high-density regions in which there is the highest proportion of the axial direction dimension accounted for by the portion corresponding to the three or more cam grooves with respect to the axial direction dimension of the cavity, and
the first gates are disposed at a location closer to one of two adjacent high-density regions than the other in the circumferential direction of the two adjacent high-density regions.

14. The injection mold according to claim 13,
wherein the third portion further has three second runners connected to the sprue,
the fourth portion further has three second gates that connect the second runners and the cavity, and
the second gates are disposed at a location closer to one of two adjacent high-density regions than the other in the circumferential direction of the two adjacent high-density regions.

15. The injection mold according to claim 14,
wherein the first gates are disposed at a location closer to one of two adjacent second gates than the other in the circumferential direction of the two adjacent second gates.

16. The injection mold according to claim 15,
wherein the high-density regions are disposed in the circumferential direction between the first gates and the other of the two adjacent second gates.

17. The injection mold according to claim 16,
wherein the first portion further has three low-density regions in which there is the lowest proportion of the axial direction dimension accounted for by the portion corresponding to the three or more cam grooves with respect to the axial direction dimension of the cavity, and
the first gates are disposed at a location closer to the high-density regions than to the low-density regions in the circumferential direction between adjacent high-density regions and low-density regions.

18. The injection mold according to claim 14,
wherein the high-density regions are disposed in the circumferential direction between the first gate portions and one of the two adjacent second gate portions.

19. The injection mold according to claim 18,
the first portion further has three low-density regions in which there is the lowest proportion of the axial direction dimension accounted for by the portion corresponding to the three or more cam grooves with respect to the axial direction dimension of the cavity, and
the first gates are disposed at a location closer to the high-density regions than to the low-density regions in the circumferential direction between adjacent high-density regions and low-density regions.

20. The injection mold according to claim 13,
wherein the first portion further has three low-density regions in which there is the lowest proportion of the axial direction dimension accounted for by the portion corresponding to the three or more cam grooves with respect to the axial direction dimension of the cavity, and
the first gates are disposed at a location closer to the high-density regions than to the low-density regions in the circumferential direction between adjacent high-density regions and low-density regions.

* * * * *